United States Patent
Morita et al.

(10) Patent No.: US 6,727,624 B2
(45) Date of Patent: Apr. 27, 2004

(54) EMBEDDED PERMANENT MAGNET TYPE INDUCTION MOTOR WHICH ALLOWS COIL EMBEDDING WORK TO BE EASILY PERFORMED

(75) Inventors: Ikuro Morita, Tokushima (JP); Hiroyuki Ikeda, Kariya (JP); Hidetoshi Hayashi, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/176,407

(22) Filed: Jun. 21, 2002

(65) Prior Publication Data

US 2003/0011266 A1 Jan. 16, 2003

(30) Foreign Application Priority Data

Jun. 21, 2001 (JP) ......................................... 2001-187831

(51) Int. Cl.⁷ ............................................... H02K 21/46
(52) U.S. Cl. ................... 310/156.78; 310/211; 310/261
(58) Field of Search ........................... 310/211, 156.07, 310/156.78, 156.79, 156.82, 156.83, 156.84, 112, 261, 156.47, 156.45, 166, 216; 29/598

(56) References Cited

U.S. PATENT DOCUMENTS

| 2,303,893 | A | * | 12/1942 | Friedrich | 310/156.79 |
| 2,643,350 | A | * | 6/1953 | Merrill | 310/156.79 |
| 3,126,493 | A | * | 3/1964 | Honsinger | 310/156.84 |
| 4,139,790 | A | * | 2/1979 | Steen | 310/156.83 |
| 4,358,696 | A | * | 11/1982 | Liu et al. | 310/156.84 |
| 4,358,697 | A | * | 11/1982 | Liu et al. | 310/156.84 |
| 4,506,181 | A | * | 3/1985 | Jones et al. | 310/156.78 |
| 4,525,925 | A | * | 7/1985 | Jones | 29/598 |
| 4,568,846 | A | * | 2/1986 | Kapadia | 310/156.83 |
| 4,922,152 | A | * | 5/1990 | Gleghorn et al. | 310/156.84 |
| 5,097,166 | A | * | 3/1992 | Mikulic | 310/156.83 |
| 5,548,172 | A | * | 8/1996 | Kliman et al. | 310/156.81 |
| 5,962,944 | A | * | 10/1999 | Narita et al. | 310/156.53 |
| 6,088,905 | A | * | 7/2000 | Boyd et al. | 29/598 |

FOREIGN PATENT DOCUMENTS

| JP | 53020515 | * | 2/1978 | .......... H02K/21/08 |
| JP | 55077359 | * | 11/1978 | .......... H02K/21/08 |
| JP | 57186966 | * | 11/1982 | .......... H02K/21/08 |
| JP | 61177146 | * | 8/1986 | .......... H02K/21/08 |
| JP | 04275051 | * | 4/1992 | .......... H02K/17/16 |

\* cited by examiner

Primary Examiner—Nicholas Ponomarenko
Assistant Examiner—Heba Elkassabgi
(74) Attorney, Agent, or Firm—Squire, Sanders & Dempsey L.L.P.

(57) ABSTRACT

An embedded permanent magnet type induction motor has a rotor that is a lamination of a plurality of rotor core plates (10). The rotor core plate is provided with a plurality of rotor slots (12) each inclined by an angle α with respect to a radial direction of the rotor core plate. The rotor has the axial length L being made of laminations divided into at least two equal portions with respect to its central axis. The divided laminations are combined with one another so that one of the divided laminations is opposed to another in inclination of the angle α and the plurality of rotor slots of one of the divided laminations are respectively superposed on the rotor slots of another at at least their ends closer to the central axis of the rotor to form a skew angle β.

5 Claims, 4 Drawing Sheets

EMBEDDED PERMANENT MAGNET TYPE INDUCTION MOTOR WHICH ALLOWS COIL EMBEDDING WORK TO BE EASILY PERFORMED

BACKGROUND OF THE INVENTION

The present invention relates to an embedded permanent magnet type induction motor.

A prior art embedded permanent magnet type induction motor (hereinafter referred to as the induction motor) will be described below with reference to FIGS. 1 and 2. FIG. 1 shows a rotor core plate which constitutes the rotor of the induction motor, and FIG. 2 is a perspective view schematically showing the stator of the induction motor.

Referring to FIG. 1, a rotor core plate 40 is a circular thin plate having an aperture 41 in its center. A plurality of rotor slots 42 in which conductors, respectively, are to be embedded are provided in the rotor core plate 40 on the outer peripheral side thereof in the state of being spaced in the circumferential direction at constant intervals. A plurality of holes 43 in which plate-shaped permanent magnets, respectively, are to be embedded are formed in the area between the aperture 41 and the rotor slots 42. The holes 43 are formed in such a manner that four holes are symmetrically disposed.

After a multiplicity of rotor core plates 40 have been formed into a lamination, conductors (not shown) are embedded into the respective rotor slots 42 by injection molding techniques, and permanent magnets (not shown) are embedded in the respective holes 43.

It is known that motor performance can be improved by giving a skew angle to the extending direction of each coil embedded in the stator or each of the conductors embedded in the rotor.

FIG. 2 shows a stator in which the skew angle is realized. As shown in FIG. 2, a stator 50 is formed of a lamination of a multiplicity of stator core plates 51. Each of the stator core plates 51 is a circular plate having an aperture 52 in its center. A plurality of stator slots 53 in which coils, respectively, are to be embedded are provided in each of the stator core plates 51 on the inner peripheral side thereof in the state of being spaced in the circumferential direction at constant intervals.

After a multiplicity of stator core plates 51 have been formed into a lamination, coils (not shown) are embedded in the respective stator slots 53. Particularly when the stator core plates 51 are being laminated one by one, the stator core plates 51 are laminated while the position of each of the stator core plates 51 is being deviated from that of the previous one in the circumferential direction to a slight extent, whereby a skew angle β is formed.

As described above, the reason why the skew angle β is realized in the stator 50 is that the stator core plates 51 needs to be laminated while each of the stator core plates 51 is being deviated from the previous one in the circumferential direction to a slight extent. In other words, in the case of the rotor 40 shown in FIG. 1, because permanent magnets need to be embedded in the respective holes 43, the rotor core plates 40 cannot be laminated while each of the rotor core plates 40 is being deviated from the previous one in the circumferential direction.

However, during the work of embedding coils in the respective stator slots 53 after laminating, workability and productivity are inferior because passages each formed by a multiplicity of stator slots 53 arranged consecutively are extended in the inclined direction.

SUMMARY OF THE INVENTION

Therefore, the present invention provides an embedded permanent magnet type induction motor which makes it possible to improve workability and productivity during the manufacture of motor bodies.

An embedded permanent magnet type induction motor according to the present invention comprises a rotor made of a plurality of rotor core plates laminated to an axial length L along its central axis. Each of the plurality of rotor core plates has a plurality of rotor slots in which coils, respectively, are to be embedded. The plurality of rotor slots are spaced apart from one another in a circumferential direction of the rotor. Each of the plurality of rotor core plates further has at least two holes in which permanent magnets are to be embedded.

According to an aspect of the present invention, each of the rotor core plates is provided with the plurality of rotor slots each inclined by an angle α with respect to a radial direction of each of the rotor core plates. The rotor has the axial length L being made of laminations divided into at least two equal portions with respect to the central axis. The divided laminations are combined with one another so that one of the divided laminations is opposed to another in inclination of the angle α and the plurality of rotor slots of one of the divided laminations are respectively superposed on the rotor slots of another at at least their ends closer to the central axis of the rotor to form a skew angle β in each of passages formed by the plurality of rotor slots extending along the axial length L.

BRIEF DESCRIPTION OF THE DRAWINGS

The invention will become more readily appreciated and understood from the following detailed description of a preferred embodiment of the invention when taken in conjunction with the accompanying drawings, in which.

DETAILED DESCRIPTION OF THE PRESENT INVENTION

An embedded permanent magnet type induction motor (hereinafter referred to as the induction motor) according to a preferred embodiment of the present invention will be described below with reference to FIGS. 3 to 5. A feature of the induction motor according to the present invention resides in the fact that a skew angle can be realized in a rotor. In other words, in a stator, the position of each of its stator core plates need not be deviated from that of the previous one in the circumferential direction while the stator core plates are being laminated.

Figure 1:
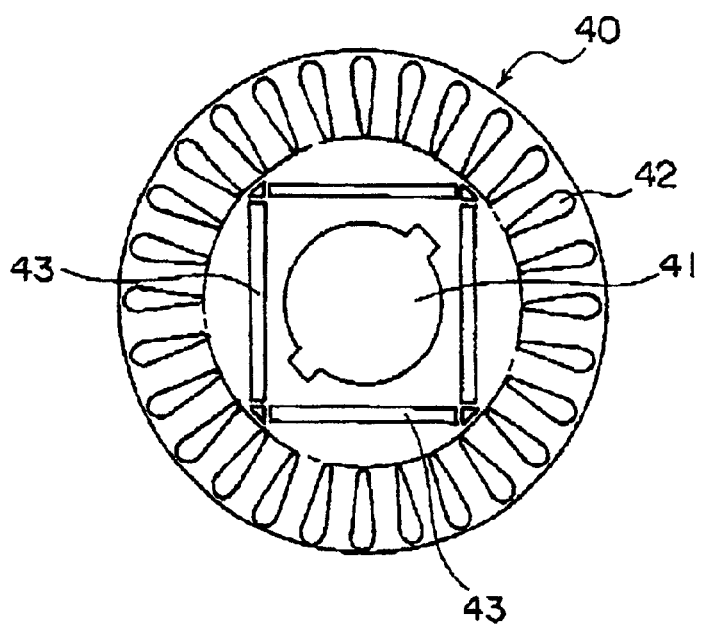
FIG. 1 is a view showing a rotor core plate which constitutes a rotor in a prior art embedded permanent magnet type induction motor.
Figure 2:
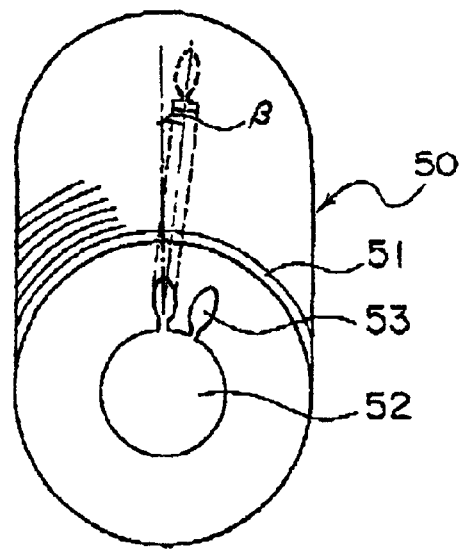
FIG. 2 is a view schematically showing a stator of the prior art embedded permanent magnet type induction motor.
Figure 3:
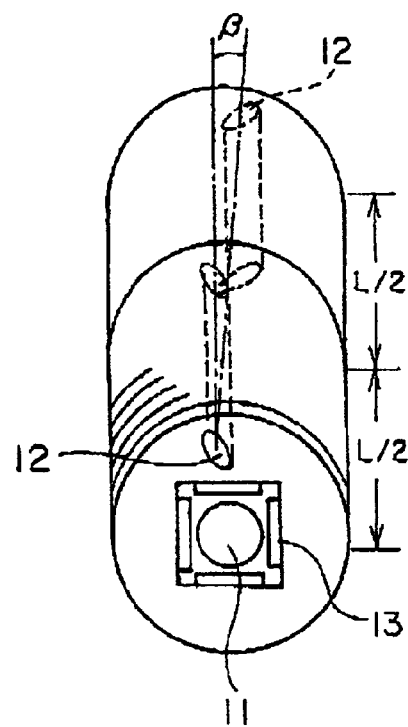
FIG. 3 is a perspective view schematically showing a rotor of an embedded permanent magnet type induction motor according to the present invention.
Figure 4:
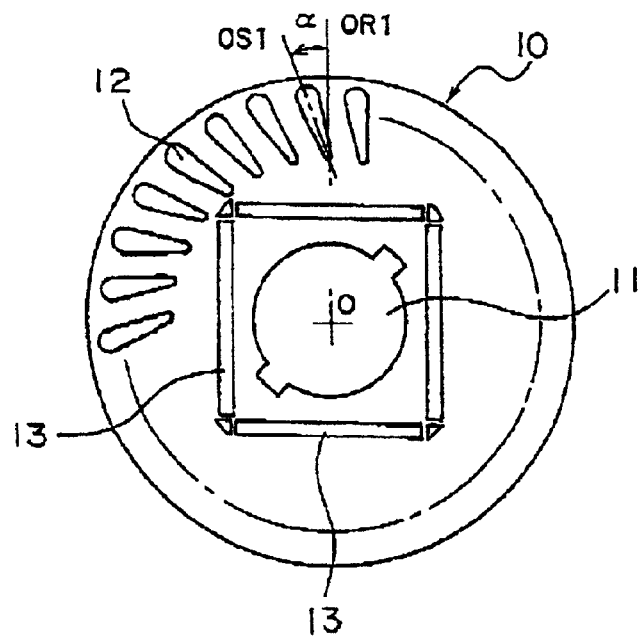
FIG. 4 is a view showing a rotor core plate which constitutes the rotor shown in FIG. 3.
Figure 5:
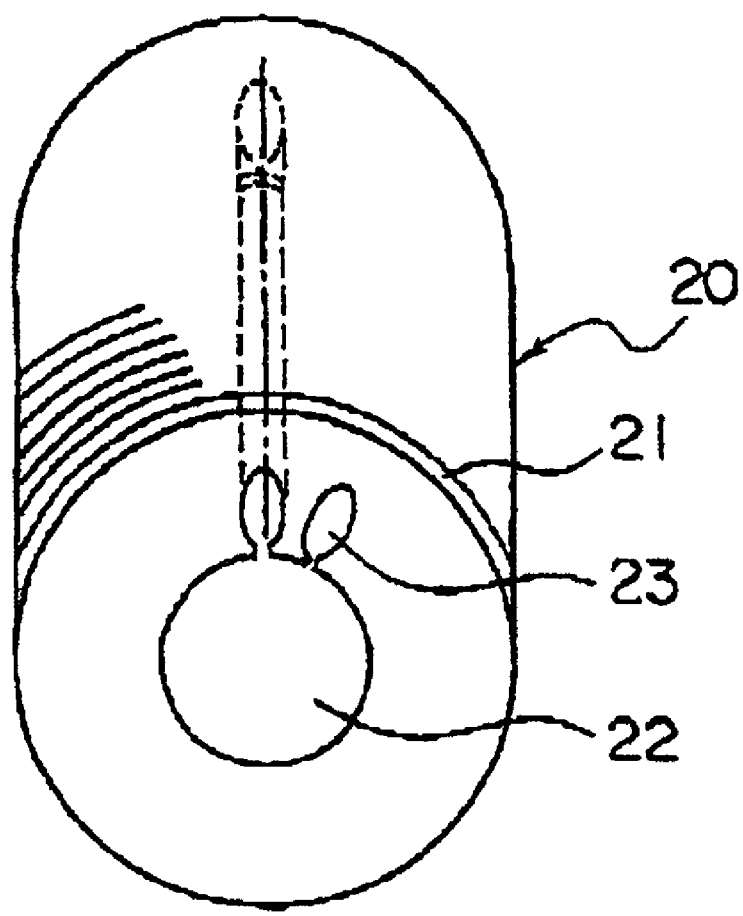
FIG. 5 is a perspective view schematically showing a stator to be combined with the rotor shown in FIG. 3.

FIG. 3 is a perspective view schematically showing the rotor of the induction motor according to the embodiment of the present invention, and FIG. 4 shows a rotor core plate which constitutes the rotor shown in FIG. 3. FIG. 5 is a perspective view schematically showing the stator of the induction motor to be combined with the rotor shown in FIG. 3. Incidentally, in FIGS. 3 to 5, the respective constituent elements are not shown to correspond accurately in size to one another. The rotor shown in FIG. 3 is combined with an aperture 22 of the stator 20 shown in FIG. 5.

Referring to FIG. 4, a rotor core plate 10 is a circular thin plate having an aperture 11 in its center. A plurality of rotor slots 12 (part of which are shown) in which conductors, respectively, are to be embedded are provided in the rotor core plate 10 on the outer peripheral side thereof in the state of being spaced in the circumferential direction at constant intervals. A plurality of holes 13 in which plate-shaped permanent magnets, respectively, are to be embedded are formed in the area between the aperture 11 and the rotor slots 12. In the embodiment, the holes 13 are formed in such a manner that four holes are disposed symmetrically about the central axis of the rotor, but the number of permanent magnets is not limited to four. The number of the permanent magnets may be equal to two and six or more.

In particular, each of the rotor slots 12 of the rotor core plate 10 is inclined by an angle α with respect to the radial direction of the rotor core plate 10. Namely, each of the rotor slots 12 is formed so that a central line segment OS1 of each of the rotor slots 12 forms the angle α with respect to a radial line segment OR1 of the rotor core plate 10. Besides, the angle α is an angle by which each of the rotor slots 12 is inclined about one end closer to the central axis of the rotor (in FIG. 4, a lower end). It has been confirmed that the angle α is preferably in the range between 5° and 10°.

Referring to FIG. 3 as well, the rotor according to the embodiment is also regarded as being made of laminations divided into half with respect to the direction of its central axis. The divided laminations are combined so that one of the divided laminations is opposed to the other in the inclination of the angle α. In addition, the two divided laminations are combined so that each of the rotor slots 12 of one of the divided laminations is superposed on the corresponding one of the rotor slots 12 of the other at at least their ends closer to the central axis of the rotor. In other words, one of the divided laminations is combined with the other of the divided laminations in the manner of being turned inside out. Consequently, as is apparent from FIG. 3, the skew angle β is formed in each passage along which the rotor slots 12 are consecutively arranged to extend along the axial length L of the entire rotor. In FIG. 3, only one of the rotor slots 12 is shown for the sake of convenience.

The lamination shown In FIG. 3 can be formed by laminating the rotor core plates 10 one by one over the first axial length L/2 and further laminating the rotor core plates 10 over the next axial length L/2 in the state of being turned inside out. Alternatively, the lamination shown in FIG. 3 can also be formed by preparing two divided laminations in each of which the rotor core plates 10 are laminated in advance and combining one with the other of the two divided laminations in the state of being turned inside out.

Incidentally, the rotor of axial length L may also be formed not by the two divided laminations each having the axial length L/2 but by four divided laminations each having an axial length L/4. The combination method of this case is the same as that described in connection with FIG. 3.

Conductors are formed in the rotor laminated as shown in FIG. 3, by embedding a material such as molten aluminum which constitute the conductors, in each of the rotor slots 12 by the same technique as injection molding. At this time, at the boundary between one and the other of the two divided laminations, the rotor slots 12 of one of the divided laminations are superposed on the respective rotor slots 12 of the other at at least their ends closer to the central axis of the rotor. Accordingly, the conductors are charged into the entire passages inside the respective rotor slots 12. After the formation of the conductors, permanent magnets are embedded in the respective holes 13.

By using the rotor having the conductors each having the skew angle β formed in the above-described manner, it becomes unnecessary to form a skew angle in the stator 20. Specifically, referring to FIG. 5, a plurality of stator slots 23 (part of which are shown) in which coils, respectively, are to be embedded are provided in each of stator core plates 21 on the inner peripheral side thereof in the state of being spaced in the circumferential direction at constant intervals. The stator 20 is formed merely by laminating the plurality of stator core plates 21 while aligning the stator slots 23 so that passages formed by the stator slots 23 extend in the same direction as the central axis. This means that it is not necessary to laminate the stator core plates 21 while deviating each of the stator core plates 21 from the previous one in the circumferential direction as in the prior art.

By using the above-described rotor and stator, it is possible to obtain motor performance equivalent to the prior art. In addition, since the stator core plates 21 are laminated without being deviated in the circumferential direction, the passages formed by the stator slots 23 are rectilinear, so that the work of embedding coils becomes easy and productivity can be improved.

Two methods are available as the method of forming the inclination α The first method is to form the inclination α by rotating the upper side (closer to the outer periphery of the rotor) of each of the rotor slots 12 about the lower side thereof (the end closer to the central axis of the rotor). The second method is to form the inclination α by rotating the lower side (the end closer to the central axis of the rotor) of each of the rotor slots 12 about the upper side thereof (closer to the outer periphery of the rotor).

Figure 6:
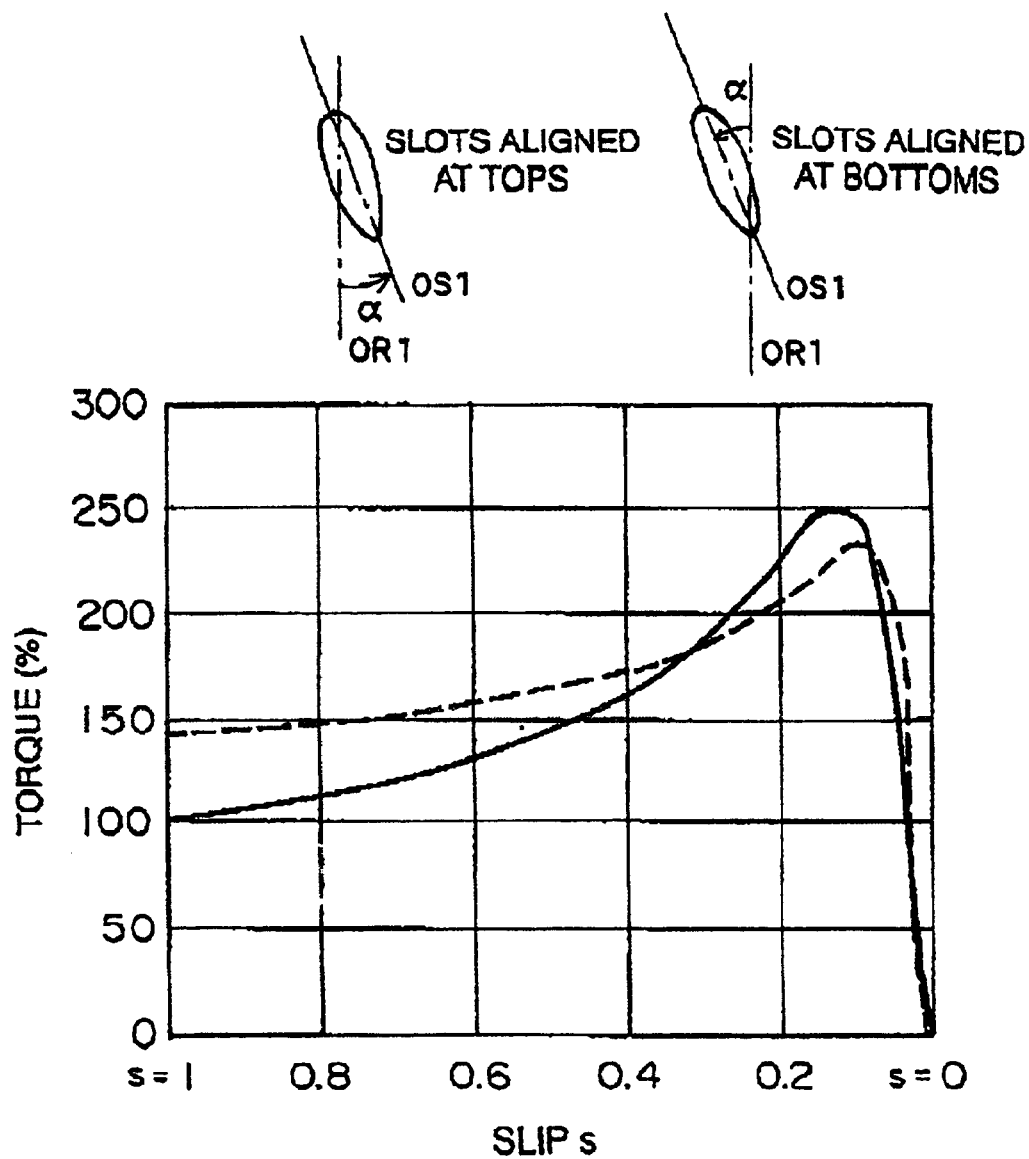
FIG. 6 is a graph aiding in explaining a torque generation capacity of the embedded permanent magnet type induction motor using the rotor according to the present invention.

FIG. 6 is a characteristic graph obtained by measuring the torque generation performance of the induction motors in the first and second methods. In the motor of the second method (shown by a solid line in FIG. 6), when the inclination α is inverted at a position of the axial length L/2, the upper sides of the rotor slots 12 are superposed on one another. On the other hand, in the present invention using the second method (shown by a dashed line in FIG. 6), when the inclination α is inverted at a position of the axial length L/2, the lower sides of the rotor slots 12 are superposed on one another. Since the lower sides of the rotor slots 12 are superposed on one another, a structure close to a squirrel-cage structure can be obtained, whereby the torque generation performance is improved. This is why the inclination α is formed by rotating the upper side of each of the rotor slots 12 about the lower side thereof in the above-described embodiment.

What is claimed is:

1. An embedded permanent magnet type induction motor comprising a rotor made of a plurality of rotor core plates laminated to an axial length L along its central axis, the plurality of rotor core plates having a plurality of rotor slots in which coils, respectively, are to be embedded, the plurality of rotor slots being spaced apart from one another in a circumferential direction of the rotor, the plurality of rotor core plates further having at least two holes in which permanent magnets are to be embedded, wherein:

each of the rotor core plates is provided with the plurality of rotor slots each inclined by an angle α with respect to a radial direction of each of the rotor core plates;

the rotor having the axial length L being made of laminations divided into at least two equal portions with respect to the central axis;

the divided laminations being combined with one another so that one of the divided laminations is opposed to another in inclination of the angle α and the plurality of rotor slots of one of the divided laminations are respectively superposed on the rotor slots of another at at least their ends closer to the central axis of the rotor to form a skew angle β in each of passages formed by the plurality of rotor slots extending along the axial length L.

2. An embedded permanent magnet type induction motor according to claim 1, wherein the angle α is an angle by which each of the plurality of rotor slots is inclined about one end closer to the central axis.

3. An embedded permanent magnet type induction motor according to claim 1, wherein the angle α is between 5° and 10°.

4. An embedded permanent magnet type induction motor according to claim 1, wherein four holes in which the permanent magnets are to be embedded are formed to be disposed symmetrically about the central axis of the rotor.

5. An embedded permanent magnet type induction motor according to claim 1, further comprising a stator with which the rotor is combined, the stator being made of a lamination of a plurality of stator core plates in each of which a plurality of stator slots in which coils, respectively, are to be embedded are formed to be spaced apart from one another in its circumferential direction, the stator core plates being laminated with the stator slots of each of the stator core plates aligned with the respective stator slots of the next so that passages formed by the stator slots extend in the same direction as the central axis.

* * * * *